(12) United States Patent
Stanforth

(10) Patent No.: US 6,590,133 B2
(45) Date of Patent: Jul. 8, 2003

(54) REDUCING LEAD BIOAVAILABILITY

(75) Inventor: Robert R. Stanforth, Singapore (SG)

(73) Assignee: National University of Singapore, Singapore (SG)

( * ) Notice: Subject to any disclaimer, the term of this patent is extended or adjusted under 35 U.S.C. 154(b) by 137 days.

(21) Appl. No.: 09/736,307

(22) Filed: Dec. 15, 2000

(65) Prior Publication Data

US 2002/0115899 A1 Aug. 22, 2002

Related U.S. Application Data

(60) Provisional application No. 60/172,574, filed on Dec. 20, 1999.

(51) Int. Cl.$^7$ ............................... A62D 3/00; B09B 3/00
(52) U.S. Cl. .................... 588/231; 588/236; 405/125.75
(58) Field of Search ................................ 588/231, 236; 405/128.1, 128.15, 128.45, 128.5, 128.7, 128.75

(56) References Cited

U.S. PATENT DOCUMENTS

| | | | |
|---|---|---|---|
| 4,737,356 A | | 4/1988 | O'Hara et al. |
| 4,889,640 A | | 12/1989 | Stanforth |
| 5,037,479 A | | 8/1991 | Stanforth |
| 5,193,936 A | | 3/1993 | Pal et al. |
| 5,245,114 A | | 9/1993 | Forrester |
| 5,285,000 A | * | 2/1994 | Schwitzgebel ......... 106/287.19 |
| 5,430,233 A | | 7/1995 | Forrester |
| 5,512,702 A | | 4/1996 | Ryan et al. |
| 5,536,899 A | | 7/1996 | Forrester |
| 5,569,152 A | | 10/1996 | Smith |
| 5,569,155 A | | 10/1996 | Pal et al. |
| 5,630,785 A | * | 5/1997 | Pridemore et al. .......... 588/255 |
| 5,967,230 A | * | 10/1999 | Cooper et al. .............. 166/245 |
| 6,210,078 B1 | * | 4/2001 | Redwine et al. ............ 405/263 |
| 2002/0022756 A1 | * | 2/2002 | Chowdhury et al. ......... 588/15 |
| 2002/0034421 A1 | * | 3/2002 | Kukor et al. .......... 405/128.75 |

OTHER PUBLICATIONS

Environ. Sci Technol. 1998, 32, 2763–2768, "In Vitro Soil Pb Solubility in the Presence of Hydroxyapatite", Pengchu Zhang et al.
Analysis Paper: Imparct of Lead–Contaminated Soil in Public Health, May 1992, Charles Xintaras, Sc. D., Office of the Assistant Administrator, ATSDR.
Environ. Sci. Technol. 1992, 26, 1242–1248, "Lead Bioavailability: Dissolution Kinetics under Simulated Gastric Conditions", Michael V. Ruby et al.
Environ. Sci. Technol. 1994, 28, 646–654, "In Situ–Formation of Lead Phosphates in Soils as a Method to Immobilize Lead", Michael V. Ruby et al.
Environ. Sci. Technol. 1996, 30, 422–430, "Estimation of Lead and Arsenic Bioavailability Using a Physiologically Based Extraction Test", Michael V. Ruby et al.
Geochimica et Cosmochimica Acts, 1974, vol. 38, pp. 887–898. Pergamon Press, "Lead orthophosphates–IV Formation and stability in the environment", Jerome O. Nriagu.
Environ. Sci. Technol. 1993, 27, 1803–1810, "In Situ Lead Immobilization by Apatite", QL Ying Ma et al.
AFS Transactions, Treatment of Hazaradous Foundry Melting Furnace Dust and Sludges, D. L. Nagle et al.
Environ. Sci. Technol. 1996, 30, 761–769, "Lead Release from Smelter and Mine Wast Impacted Materials under Simulated Gastric Conditions and Relation to Specification", Ubald G. Gasser et al.
Environ. Sci. Technol. 1997, 31, 1359–1364, "In–Place Inactivation of Pb in Pb–Contaminated Soils", William R. Berti et al.

* cited by examiner

Primary Examiner—Stanley S. Silverman
Assistant Examiner—Anthony Kuhar
(74) Attorney, Agent, or Firm—Birch, Stewart, Kolasch & Birch, LLP

(57) ABSTRACT

A method for reducing the solubility of lead during digestion or in the environment has been developed. Lead is incorporated into a solid material formed by the in situ oxidation of iron. This can be accomplished by introducing ferrous iron into the soil, either in solid or liquid form, and then oxidizing the iron with either air or an introduced oxidant. Solubility of the lead is significantly reduced even under very acidic conditions by incorporation into the iron oxide material. Acid generated during the oxidation and precipitation of iron can be neutralized using common neutralizing agents such as limestone, lime, magnesium oxide, or magnesium hydroxide. In another method, the calcium or magnesium can be added either as neutral salts or as salts of alkaline anions, e.g., calcium carbonate. The calcium and magnesium ions form strong complexes with digestive enzymes, preventing the lead from forming soluble lead complexes with the enzymes. This reduces the bioavailability of the lead.

12 Claims, No Drawings

REDUCING LEAD BIOAVAILABILITY

This application claims priority on provisional Application No. 60/172,574 filed on Dec. 20, 1999, the entire contents of which are hereby incorporated by reference.

FIELD OF THE INVENTION

This invention pertains generally to the field of treating materials containing lead—such as waste materials and soil—with chemical compounds which serve to reduce the bioavailability of the lead. The materials containing lead include hazardous wastes. The present invention is particularly useful in the field of treating solid wastes containing unacceptable levels of leachable lead, in order to control leaching in the natural environment and during digestion after accidental ingestion.

BACKGROUND OF THE INVENTION

Lead is one of the more common metals found in the environment, and also one of the more toxic. It is widely distributed in soil and at waste disposal sites due to its use in leaded gasoline, paint, batteries, and general widespread industrial use. The impact of lead on humans, particularly children, is being noted at increasing lower levels. Lead impacts both learning ability and behavior, particularly in children. For that reason, there is serious concern about levels of lead in the soil, and the impact of that lead on children. The Agency for Toxic Substances and Disease Registry has estimated that the number of children in the U.S. exposed to lead in soil or dust at levels of concern is between 5.9 and 11.7 million (*Impact of Lead-Contaminated Soil on Public Health*, ATSDR, 1992). Thus there is an increasing need to reduce the toxicity of lead in soil and waste, as well as to provide for safe disposal of lead-containing wastes.

Much of the focus of lead treatment studies until recently has been on the reduction of the leaching potential of lead from waste materials, particularly as measured in the U.S. Environmental Protection Agency's Toxicity Characteristic Leaching Procedure (TCLP) test, which is used to classify wastes as hazardous. A number of treatment technologies have been developed for immobilizing lead in wastes using phosphate, so as to render the wastes non-hazardous. See e.g. U.S. Pat. Nos. 4,737,356, 5,037,479, 5,193,936, 5,245,114, 5,430,233, 5,512,702, 5,536,899, and 5,569,155.

Less work has been done on reducing lead availability to the body following (accidental) ingestion of soil or waste. Part of the reason for this lack of emphasis on human uptake following ingestion had been the lack of an effective means of monitoring uptake during the digestion process. However, recently developed laboratory tests provide relatively simple tests for simulating the uptake during digestion, notably the Physiologically Based Extraction Test (PBET) developed by Ruby et al. See Ruby et al., "Lead Bioavailability: Dissolution Kinetics under Simulated Gastric Conditions", *Environmental Science and Technology*, 26:1242–1248 (1992); Ruby et al., "In Situ Formation of Lead Phosphates in Soils as a Method to Immobilize Lead", *Environmental Science and Technology*, 28:646–654 (1994); Ruby et al., "Estimation of Lead and Arsenic Bioavailability Using a Physiologically Based Extraction Test", *Environmental Science and Technology*, 30:422–430 (1996), and the test developed by Gasser et al., "Lead Release from Smelter and Mine Waste Impacted Materials under Simulated Gastric Conditions and Relation to Speciation", Environmental Science and Technology, 30:761–769 (1996).

The Ruby et al (1992) Physiologically Based Extraction Test (or PBET test) involves a two step process. In the first step, the material being tested is exposed to an acidic (HCl) solution containing the digestive enzymes pepsin, citrate, malate, lactic acid, and acetic acid. The slurry is mixed for one hour at 37° C., then a small sample is taken for dissolved metal analysis. The remaining solution is neutralized to pH 7 and bile salts and pancreatin are added. The slurry is mixed for 4 more hours, then the solution is analyzed for dissolved metals. The first step models the digestive conditions found in the stomach, while the second step represents the digestive conditions as the chyme (digesting material) moves out of the stomach and into the small intestines.

Many of the treatment processes for lead in industrial wastes or soil involve the addition of orthophosphate to form insoluble lead phosphates. See the patents listed above. Phosphate, and especially phosphate combined with chloride, can reduce the solubilized concentrations of lead from a contaminated soil in the simulated digestion test leachates, as shown in Table 1.

TABLE 1

Lead Concentrations in Simulated Digestion Test Leachates: in Untreated Soil and in Soil Treated with Phosphate and Phosphate plus Chloride.

| Sample | Simulated Digestion Test Leachate Lead Concentrations, mg/L | |
|---|---|---|
| | Stomach | Intestines |
| Soil 1 | | |
| Untreated | 17.1 | 12.4 |
| +1.1% Phosphate (as TSP) | 5.25 | 4.74 |
| +1.1% Phosphate and 0.3% NaCl | 4.69 | 3.63 |
| Soil 2 | | |
| Untreated | 125 | 52.1 |
| +1.1% Phosphate (as TSP) | 23.2 | 21.7 |

The dosages given in Table 1 above and in the Tables hereinbelow are based on the weight of additive to the weight of soil sample, both on an "as is" basis (i.e., wet weight).

In simulated digestion (PBET) tests run on contaminated soils, there is only a slight reduction in lead concentrations as the material goes from the acid to the neutral stages of the test. Since one would expect the solubility of lead to go down with the increase in pH from acid to neutral conditions, the results suggest that the lead is being complexed (and hence stabilized in solution) by the digestive enzymes. Lead concentrations in the leachate representing the intestinal phase of the simulated digestion tests are still well over the solubility levels found for the soil at neutral pH values. Further reduction in the lead concentrations requires either that the complexes between the lead and digestive enzymes be broken or that a more effective stabilization method be developed.

During digestion, the material passes first through the stomach, where it is subjected to quite acidic conditions, then into the small intestines where the pH is raised to near neutral. In both areas, digestive enzymes are introduced that aid in the breakdown of the food. The low pH of the stomach acid, combined with the complexing capacity of the digestive enzymes creates a very aggressive environment for lead solubilization from the ingested soil or waste. Most lead compounds are quite soluble in the acidic solutions found in the stomach. Once the lead is solubilized, the digestive enzymes can complex the lead to maintain it in solution as the stomach contents (or chyme) is neutralized. Further, the lead contents of most soils and many wastes is comparatively low (i.e., less than 1% by weight), which further enhances the solubilization of lead from the soil. Thus any treatment process that will immobilize lead during digestion must be particularly effective at lowering the solubility of lead, or in reducing the contact between lead and the digestive solutions.

As evidenced by Table 1, addition of phosphate or phosphate plus chloride can reduce the solubility of lead. Addition of phosphate results in the formation of the insoluble lead phosphate compounds, such as pyromorphite or chloropyromorphite. These compounds are the least soluble common lead compounds in environmental samples. The use of phosphate for immobilizing lead in regulatory leaching tests or in the environment has been documented. See Nagle et al., "Treatment of Hazardous Foundry Melting Furnace Dusts and Sludges", *American Foundrymen's Society Transactions,* 87:767–785 (1983); Ruby et al., "In Situ Formation of Lead Phosphates in Soils as a Method to Immobilize Lead", *Environmental Science and Technology,* 28:646–654 (1994); Ma et al., "In Situ Lead Immobilization by Apatite", *Environmental Science and Technology,* 27:1803–1810 (1993); and Berti et al., "In-Place Inactivation of Pb in Pb-Contaminated Soils", *Environmental Science and Technology,* 31:1359–1364 (1997). However, further reduction in lead solubility in the PBET test is needed to reduce the uptake of lead during the very acidic conditions encountered during digestion.

With no treatment, lead is very soluble in the acid pH region (pH <5). In the stomach—with a pH of 1 to 3—lead in soil would be quite soluble, and hence available for uptake into the body. Addition of phosphate or phosphate plus chloride to lead-contaminated soil results in a much reduced solubility for lead in the acid pH region. The lead solubility is reduced through the formation of lead phosphates such as pyromorphite. See Nriagu, "Lead Orthophosphates-IV. Formation and Stability in the Environment", *Geochimica et Cosmochimica Acta,* 38:887–898 (1974) and Ma et al., "In Situ Lead Immobilization by Apatite", *Environmental Science and Technology,* 27:1803–1810 (1993). The theoretical solubility of pyromorphite is quite close to that for the lead phosphate formed in the soil (Zhang et al., "In Vitro Soil Pb Solubility in the Presence of Hydroxyapatite", *Environmental Science and Technology,* 32:2763–2768 (1998). Conversion of the lead to a lead phosphate can reduce the solubility of lead under stomach acid conditions to some extent. However, the solubility of pyromorphite is still appreciable under acidic conditions. If the lead content of the soil is insufficient to reach saturation conditions, then the lead in the soil will still be appreciably soluble, even if in the pyromorphite form.

One method that can be used to decrease lead bioavialability is to introduce cations, such as calcium or magnesium, that compete with lead for digestive enzymes. This approach constitutes an aspect of the present invention.

Some treatment methods used to stabilize lead and render a waste or soil non-hazardous use calcium or magnesium compounds to accomplish this purpose. U.S. Pat. No. 4,889,640, for example, uses reactive calcium carbonate to render waste non-hazardous, while U.S. Pat. No. 5,037,479 uses magnesium oxide in combination with a phosphate compound such as calcium dihydrogen phosphate, commercially available as TSP (Triple Superphosphate). U.S. Pat. Nos. 5,193,936 and 5,569,155 teach the use of calcium sulfate (gypsum) in conjunction with phosphate to form materials termed superhard phosphates. U.S. Pat. No. 4,737,356 teaches the use of waste lime from a scrubber in combination with water soluble phosphates to stabilize lead in municipal incinerator ash. U.S. Pat. No. 5,569,152 teaches calcium oxide addition to electric arc furnace dust from steel manufacturing to form a solidified material which has low leaching potential in TCLP tests and low permeability.

In these processes, it is not calcium or magnesium which is the key treatment reagent. Rather, the calcium or magnesium is the cation associated with the desired anion, e.g. phosphate, sulfate, hydroxide, or oxide. The calcium or magnesium compounds may have the desired pH buffering properties for the process. A pH-neutral calcium or magnesium salt such as the nitrate could not be used effectively in these processes. In this invention, however, the anion associated with the calcium or magnesium is not crucial for the success of the treatment. Rather, it is presence of the soluble calcium or magnesium ions themselves that is important.

Many other treatment methods control lead leaching by pH control or by the formation of lead compounds that are more soluble than lead phosphate (e.g. lead carbonate). However these treatment methods will not be effective at reducing lead solubility under the very acidic conditions of the stomach, and thus will be ineffective at reducing the uptake of lead during digestion. Since one of the main routes of exposure for lead is through ingestion of contaminated material, and since lead poses a significant health threat to people, a method to reduce the bioavailability of lead form soil or waste during digestion is needed.

Another method to further reduce lead solubility would be to form a protective coating of an insoluble material around the soil particle that either buries lead under the coating or incorporates the lead as part of the coating. The coating material must be insoluble in the very acidic conditions found in the stomach.

OBJECTS OF THE INVENTION

One object of this invention is to develop a means of reducing the solubility of lead during digestion by forming a protective coating of an insoluble material around the soil particle that either buries lead under the coating or incorporates the lead as part of the coating. The coating material must be insoluble in the very acidic conditions found in the stomach. In particular, lead is incorporated into an iron oxide material in the soil that stabilizes the lead against solubilization even in the very acidic conditions of the stomach. The iron oxide material is formed through the in-situ oxidation of ferrous iron in contact with the waste material to be treated. Lead treated in this fashion is also stabilized against leaching in a TCLP test, and thus the treatment process is effective both for reducing the bioavailability of lead in soil or waste and for treating hazardous lead contaminated material.

Another object of this invention is reduction of the concentration and hence bioavailability of lead in contaminated soil or waste that may be accidentally ingested, by introducing cations that displace lead from the complexes present in the digesting material.

SUMMARY OF THE INVENTION

In one aspect of the present invention, lead can be stabilized in soil or waste by incorporating the metal into the solid formed by the oxidation of ferrous iron in contact with the soil or waste. Ferrous iron is introduced into the contaminated material, then oxidized. The resultant solid incorporates the lead and reduces its solubility, both in the natural environment and during digestion. This reduction of solubility can be verified by laboratory leaching tests such as the TCLP or PBET test. Acid generated during the precipitation of hydrous ferric oxide can be neutralized using common alkaline materials such as limestone, magnesium oxide, or magnesium hydroxide.

This invention accordingly provides a method comprising the steps of: (a) adding ferrous iron to the contaminated waste materials or soil, and (b) oxidizing the ferrous iron in the waste materials or soil by drying or by chemical oxidation to form a ferric compound incorporating the lead. In a preferred embodiment of this method, the ferrous iron is added to the contaminated waste materials or soil in an amount is calculated to provide a ferrous iron content therein within the range 0.25% through 5% by weight relative to the total weight of the treated waste materials or soil. The ferrous iron may be added to the contaminated waste materials or soil in the form of a liquid reagent containing a soluble ferrous salt, e.g., ferrous nitrate, ferrous sulfate, or ferrous chloride. Alternatively, the ferrous iron may be added to the contaminated waste materials or soil in the form of a dry reagent mix of a ferrous salt, and water may be added subsequently to dissolve the ferrous salt. In accordance with this invention, oxidation of the ferrous iron may be effected by atmospheric oxygen by aerating the soil or waste or by allowing the material to dry in the air, or, alternatively, by a chemical oxidant, e.g., hydrogen peroxide. This method can comprise a further step, step (c), of neutralizing the acid formed during the treatment process with an alkaline material, e.g., calcium carbonate, calcium hydroxide, calcium oxide, magnesium hydroxide, or magnesium oxide. Step (a) may, optionally, further include the addition of a mixture of phosphate and chloride to the ferrous iron and said waste or soil.

Another important embodiment of this method of the present invention contemplates the additional addition of a source of orthophosphate to the contaminated waste materials or soil. That orthophosphate source may be added in an amount calculated to provide an orthophosphate content in the contaminated waste materials or soil within the range 1% through 10%, preferably 0.1% through 5%, by weight relative to the total weight of the treated waste materials or soil. The source of orthophosphate may be, for instance, phosphoric acid, sodium phosphate, triple superphosphate, or combinations thereof.

Products produced by the above-described methods also constitute aspects of the present invention.

In another process aspect of the present invention, calcium and/or magnesium compounds are introduced into a soil or waste material contaminated with lead. As this material is (accidentally) ingested, for example as a contaminant of food, it passes through the stomach and intestines. Digestive enzymes in the stomach and/or intestines preferentially complex the calcium and magnesium rather than lead. At the neutral pH of the intestinal material, the lead then precipitates out and is unavailable for uptake by the body. This reduces the bioavailability of the lead. The calcium or magnesium can be added either as alkaline salts or as neutral salts.

Thus this invention also provides a method comprising the step of adding calcium or magnesium compounds to the waste materials or soil. The calcium or magnesium compounds, e.g., oxide/hydroxides or carbonates, or neutral salts such as chlorides or nitrates, may be added to the contaminated waste materials or soil in an amount calculated to provide a calcium or magnesium content therein within the range 0.5% through 10% by weight relative to the total weight of the treated waste materials or soil. This method may also include a step of adding phosphate or chloride or a combination thereof to the calcium or magnesium compounds and the waste materials or soil. The product of the method, namely, waste materials or soil comprising calcium or magnesium compounds and lead, also constitutes an aspect of the present invention.

DETAILED DESCRIPTION OF THE INVENTION

Ferrous Iron Treatment

A basic concept of one aspect of the present invention incorporates lead into a insoluble material formed in situ in waste material or soil. The incorporated lead has a solubility sufficiently low such that the lead is stabilized against solubilization during digestion (as modeled in a PBET test). The lead is a priori stabilized against solubilization in a less acidic environment, such as soil. A preferred lead solubility reduction in accordance with this invention results in levels of lead available, for leaching into the environment or for uptake during digestion, of less than 0.75 mg/L as measured by the TCLP lead leaching test.

Ferrous iron treatment was tested on a number of different soils, ranging from roadside soils (AYE, CTE, and BKE) to rifle range soils (NR2 and Backstop) to highly contaminated industrial waste (steel mill electric arc furnace dust). As shown in Table 2, the treatment reduced the lead solubilized in simulated digestion tests for all samples.

TABLE 2

Reduction in Lead Concentrations in a Simulated Digestion Test by Treatment with Phosphate and Ferrous Iron

| Soil Treatment | Simulated Digestion Test Results | |
|---|---|---|
| | Stomach | Intestines |
| Roadside Soils (Pb already in a P/Cl form) | | |
| AYE 246 (mg/kg Pb) | | |
| Untreated | 0.45 | 0.24 |
| Ferrous Iron Treated (4.4% Fe) | 0.11 | 0.06 |
| CTE (257 mg/kg Pb) | | |
| Untreated | 0.34 | 0.17 |
| Ferrous Iron Treated (4.4% Fe) | 0.17 | 0.05 |
| BKE (527 mg/kg Pb) | | |
| Untreated | 0.94 | 0.40 |
| Ferrous Iron Treated (4.4% Fe) | 0.17 | 0.07 |
| NR2 (2800 mg/kg Pb) | | |
| Untreated | 18.2 | 10.1 |
| P/Cl Treated (1.1% P, 0.3% Cl) | 4.7 | 3.6 |
| P/Cl & Ferrous Iron Treated (1.1% P, 0.3% Cl, 3.3% Fe) | 0.6 | 0.3 |
| Backstop (15,000 mg/kg Pb) | | |
| Untreated | 125 | 53.1 |
| P Treated (1.1% P) | 23.2 | 21.7 |
| P and Ferrous Iron Treated (1.1% P, 3.3% Fe) | 4.23 | 2.63 |
| Industrial Waste (18,000 mg/kg) | | |
| Untreated | 54 | 5.9 |
| P Treated (5% P) | 18.1 | 0.31 |
| P and Ferrous Iron Treated (5% P, 2.2% Fe) | 7.2 | 0.15 |

The solubility of lead in the iron treated soil is considerably lower than the solubility of lead from the phosphate or phosphate/chloride treated soil. Lead concentrations are decreased by over an order of magnitude in the pH range 1 to 3, i.e., the pH range of the stomach. Since the lead must be solubilized before it can be absorbed by the body, such a reduction in soluble lead also reduces the bioavailability of the lead in the soil.

TABLE 3

Effect of Ferrous Iron Treatment on Lead Concentrations in Simulated Digestion Tests When Used Alone and in Combination with Phosphate and Phosphate/Chloride

| Sample | PBET Lead Concentration, mg/L | |
|---|---|---|
| | Stomach | Intestines |
| No Phosphate Treatment | | |
| Soil 1 | | |
| No Iron | 16.1 | 13.0 |
| 0.28% Fe (as FeSO$_4$) | 6.88 | 11.8 |
| 0.70% Fe | 4.27 | 9.00 |
| 1.4% Fe | 2.84 | 5.15 |
| Soil 2 | | |
| No Iron | 44.9 | 24.8 |
| 0.28% Fe (as FeSO$_4$) | 20.1 | 24.0 |
| 0.70% Fe | 15.2 | 13.5 |
| 1.40% Fe | 11.4 | 8.2 |
| 2.8% Fe | 7.4 | 5.3 |
| Soil With Phosphate Treatment | | |
| Untreated | 125 | 52.1 |
| 2.5% Phosphate (as NaH$_2$PO$_4$ · H$_2$O) | | |
| No Iron | 49.1 | 39.7 |
| 0.6% Fe (as FeSO$_4$) | 27.5 | 14.8 |
| 3.0% Fe (as FeSO$_4$) | 9.8 | 5.57 |
| 5% P | | |
| No Iron | 23.2 | 21.7 |
| 0.6% Fe (as FeSO$_4$) | 21.4 | 17.9 |
| 3.0% Fe (as FeSO$_4$) | 4.23 | 2.63 |

TABLE 3-continued

Effect of Ferrous Iron Treatment on Lead Concentrations in Simulated Digestion Tests When Used Alone and in Combination with Phosphate and Phosphate/Chloride

| Sample | PBET Lead Concentration, mg/L | |
|---|---|---|
| | Stomach | Intestines |
| Phosphate and Chloride Treated Soil | | |
| Untreated | 18.2 | 10.1 |
| P/Cl Treated | 4.7 | 3.6 |
| +2.2% Fe (as Fe(NO$_3$)$_2$) | 2.91 | 0.54 |
| +3.3% Fe | 1.96 | 0.64 |
| +4.4% Fe | 0.94 | 0.24 |

The ferrous iron treatment can be used on soil that is untreated by another means or on soil that is treated with phosphate or phosphate and chloride (Table 3). A 3% dose of iron (added as ferrous nitrate) reduced lead in the simulated digestion test by over 80% for the untreated soil, while a 3% dose of ferrous iron (added as ferrous sulfate) to both P and P/Cl treated soil reduced the lead concentrations in the simulated digestion test by over 90%. Thus the iron treatment can be used by itself or as a means of enhancing phosphate or phosphate plus chloride treatment.

A number of potential coating materials were tested, as shown in Table 4. Of the additives tested, only one greatly reduced lead solubility in the PBET test, namely ferrous iron which is oxidized to ferric iron after contact with the contaminated material. Other inorganic additives—such as ferric iron, ferrous iron without oxidation, manganese, aluminum, and silicates—were not effective in reducing the lead solubility.

TABLE 4

Comparison of Different Treatment Additives to Immobilize Lead in a PBET test

| Sample | PBET Lead Concentration, mg/L | |
|---|---|---|
| | Acid | Neutral |
| Untreated | 18.2 | 10.1 |
| +silicate (~1%) | 23.5 | 13.6 |
| +aluminum (3.2%) | 13.8 | 11.2 |
| +iron treatment 3.3% | 2.84 | 5.15 |
| Phosphate 1.6% Treatment | | |
| +phosphate | 5.25 | 4.7 |
| +phosphate and ferric iron 2.5% Fe | 7.0 | 4.7 |
| +phosphate and ferrous iron-no oxidation (2.5% Fe) | 8.5 | 3.7 |
| Phosphate (1%) plus Chloride (0.4%) Treatment | | |
| +Phosphate and chloride | 4.7 | 3.6 |
| +phosphate, chloride, and manganous (~3% Mn) | 6.0 | 0.04 |
| +phosphate, chloride and silicate (~1% silicate) | 13.3 | 9.2 |
| +phosphate, chloride and ferric iron (3.3% Fe) | 6.2 | 2.7 |
| +phosphate, chloride and ferrous iron-no oxidation (3.3% Fe) | 5.4 | 3.7 |
| +phosphate, chloride and ferrous iron with oxidation (3.3% Fe) | 0.6 | 0.3 |

The addition of ferrous iron to the soil without oxidation was not successful at reducing the lead concentration in the simulated digestion test. Likewise, the addition of ferric iron to the soil was not successful at reducing the lead concentration in the simulated digestion test. This indicates that treatment effectiveness in accordance with the present invention is due to the oxidation of ferrous iron as it is contact with the contaminated soil. The oxidation can be accomplished either by atmospheric oxygen, for example by allowing the soil to dry in contact with air, or by means of oxidants such as hydrogen peroxide.

The treatment process can also be used to reduce lead solubility in a TCLP test, as shown in Table 5.

TABLE 5

Effect of Iron Treatment on TCLP Test Lead Concentration

| Sample | TCLP Test Lead Concentration, mg/L |
| --- | --- |
| Soil with No P Treatment | |
| Soil 1 | |
| Untreated | 446 |
| +0.28% Fe (as $FeSO_4$) | 18.3 |
| +0.70% Fe | 5.36 |
| +1.40% Fe | 3.47 |
| +2.80% Fe | 3.02 |
| Soil 2 | |
| Untreated | 229 |
| +0.2% Fe (as $FeSO_4$) | 42.1 |
| 0.5% Fe | 18.7 |
| 1.0% Fe | 11.8 |
| 2.0% Fe | 6.50 |
| Soil 2 with 5% P Treatment | |
| No Iron | 1.60 |
| +0.12% Fe (as $FeSO_4$) | 0.64 |
| +0.6% Fe | 0.25 |

Iron treatment reduces lead solubility in a TCLP tests either when used as stand-alone treatment or in combination with phosphate. The ferrous compound can either be added in dry form and mixed with the soil prior to the addition of water, or dissolved in a liquid state.

Ferrous iron treatment can reduce the solubility of lead both from heavily contaminated soils, as illustrated above, and also from soils contaminated with much lower levels of lead, such as roadside soils. The roadside soils would not be classified as hazardous under the U.S. EPA regulations, but still release significant concentrations of lead in the simulated digestion test. The lead in roadside soil comes from the previous use of leaded gasoline, and is very common due to the widespread use of leaded gasoline prior to its banning. Although leaded gasoline is no longer used, the lead in the soil remains in the topmost layers of soil for extended time periods, and can pose a threat for consumption if dust from the soil becomes airborne (or if someone comes in direct contact with the soil). The lead in the soil is most likely in a lead chlorophosphate form. Thus reducing the toxicity of lead from the roadside soil could result in a significant reduction in the threat from lead in the environment. Addition of ferrous iron reduced the PBET-soluble lead by between 50 and 80%.

The ferrous iron will oxidize to ferric iron, which then precipitates as hydrous ferric oxide. This precipitation step can generate acid. The treatment process can be further improved by the addition of alkaline buffers, such as calcium carbonate, magnesium oxide, or magnesium hydroxide, or alkaline materials such as calcium hydroxide or calcium oxide, to neutralize any acids generated by the iron as it precipitates. However, this pH adjustment step, while beneficial, is not essential for the treatment process.

Calcium and Magnesium Treatment

While soil or waste are not normally intentionally consumed, at least by humans, it is not unusual for food—such as salad greens—to contain such materials. Moreover, very young children sometimes do consume soil or waste materials. Soil or waste contaminated with lead can release the lead during digestion so that the body absorbs the toxic metal. Tests on contaminated soils and roadside soils, using Ruby's PBET test as a model for the digestive process, show that almost all the lead present in the soil is released during digestion. To reduce the toxicity of the lead, means must be found to reduce the dissolved concentration of lead in the digestive fluids. In the intestinal phase of digestion, lead appears to be stabilized in solution by complexes with the digestive enzymes. Reducing the toxicity of lead, therefore, requires breaking the complexes between lead and the digestive enzymes. This is accomplished in the present invention by means of metals that more strongly complex the digestive enzymes than does lead.

It has been found that calcium and magnesium ions are particularly effective at reducing the concentrations of lead in the simulated digestion test solutions (Table 6a). This result is unexpected, since many metals—including sodium, ferric iron, ferrous iron, and copper—are not effective in reducing concentrations of lead in simulated digestion test solutions (Table 6b).

TABLE 6a

Effect of Treatment with Various Cations on Lead Concentrations from Treated Soil in Simulated Digestion Tests

| | Simulated Digestion Test Leachate Lead Concentrations, mg/L | | | |
| --- | --- | --- | --- | --- |
| | P Treated | | P/Cl Treated | |
| Soil Treatment | Stomach | Intestines | Stomach | Intestines |
| None | 5.25 | 4.74 | 4.69 | 3.63 |
| Magnesium Added as Magnesium Hydroxide | | | | |
| 1% $Mg(OH)_2$ | 4.68 | 1.59 | 7.23 | 3.09 |
| 2.5% $Mg(OH)_2$ | 3.21 | 0.30 | 3.10 | 0.69 |
| 5% $Mg(OH)_2$ | 2.31 | 0.19 | 1.57 | 0.20 |
| Calcium Added as Calcium Carbonate | | | | |
| 1% $CaCO_3$ | 13.4 | 3.72 | 6.21 | 3.05 |
| 2.5% $CaCO_3$ | 6.14 | 0.86 | 5.86 | 0.62 |
| 5% $CaCO_3$ | 3.90 | 0.44 | 2.08 | 0.11 |

TABLE 6b

Effect of Treatment with Various Cations on Lead Concentrations from Treated Soil in Simulated Digestion Tests Simulated Digestion Test Leachate Lead Concentrations, mg/L

| Soil Treatment | P Treated | | P/Cl Treated | |
|---|---|---|---|---|
| | Stomach | Intestines | Stomach | Intestines |
| None | 5.25 | 4.74 | 4.69 | 3.63 |
| Sodium Added as Sodium Carbonate | | | | |
| 1% Na$_2$CO$_3$ | 8.60 | 5.33 | 5.57 | 4.31 |
| 2.5% Na$_2$CO$_3$ | 8.07 | 5.34 | 2.61 | 2.43 |
| 5% Na$_2$CO$_3$ | 5.41 | 4.44 | 3.97 | 3.66 |
| Ferrous Iron Added as Ferrous Sulfate | | | | |
| 2% FeSO$_4$ | 7.20 | 3.93 | 4.62 | 2.76 |
| 5% FeSO$_4$ | 9.70 | 3.54 | 6.19 | 4.70 |
| Ferric Iron Added as Ferric Nitrate | | | | |
| 2% Fe(NO$_3$)$_3$ | 8.66 | 5.74 | 5.46 | 2.55 |
| 5% Fe(NO$_3$)$_3$ | 5.27 | 3.69 | 6.99 | 2.81 |
| Copper Added as Copper Sulfate | | | | |
| 2% CuSO$_4$ | 9.34 | 5.17 | 8.64 | 3.74 |
| 2% CuSO$_4$ | 10.17 | 3.16 | 8.16 | 2.37 |

Unlike known treatment methods using calcium or magnesium, the present method does not depend on the anion associated with the calcium or magnesium. Instead, it is the presence of the soluble calcium or magnesium ions themselves that is important. The calcium and magnesium can be added either as alkaline salts (e.g., calcium carbonate, magnesium hydroxide) as demonstrated in Table 7, or as non-alkaline salts (e.g., calcium nitrate, magnesium nitrate) as demonstrated in Tables 8a and 8b. In these Tables, the designation "% Red" denotes percent reduction in lead concentration as compared to sample with no magnesium or calcium addition.

TABLE 7

Effect of Alkaline Calcium and Magnesium Compounds on Lead Concentrations in Simulated Digestion Test Leachates Lead Concentrations in Simulated Digestion Test Leachates, mg/L

| | P Treated | | | | P/Cl Treated | | | |
|---|---|---|---|---|---|---|---|---|
| | Acid | | Neutral | | Acid | | Neutral | |
| Sample Treatment | Conc | % Red | Conc | % Red | Conc | % Red | Conc | % Red |
| Sample 1 | | | | | | | | |
| None | 5.25 | | 4.74 | | 4.69 | | 3.63 | |
| Magnesium Added as Magnesium Hydroxide | | | | | | | | |
| 0.41% Mg | 7.23 | | 3.09 | 35 | 4.68 | | 1.59 | 56 |
| 1.03% Mg | 3.10 | 41 | 0.69 | 85 | 3.21 | 32 | 0.30 | 92 |
| 2.06% Mg | 1.57 | 70 | 0.20 | 96 | 2.31 | 51 | 0.19 | 97 |
| Calcium Added as Calcium Carbonate | | | | | | | | |
| 0.40% Ca | 13.43 | | 3.72 | 22 | 6.21 | | 3.05 | 16 |
| 1.00% Ca | 6.14 | | 0.86 | 82 | 5.86 | | 0.62 | 83 |
| 2.00% Ca | 3.90 | | 0.44 | 91 | 2.08 | | 0.11 | 97 |
| Sample 2 | | | | | | | | |
| None | 30.8 | | 28.3 | | 29.4 | | 25.7 | |
| Magnesium Added as Magnesium Hydroxide | | | | | | | | |
| 0.41% Mg | 17.4 | 44 | 15.9 | 44 | 14.4 | 51 | 7.87 | 69 |
| 0.82% Mg | 12.2 | 60 | 9.42 | 67 | 23.6 | 20 | 6.19 | 76 |

TABLE 8a

Effect of Neutral Calcium and Magnesium Compounds on Lead Concentrations in Simulated Digestion Test Leachates - Sample 1

Simulated Digestion Test Leachate Lead Concentration, mg/L

| | Untreated | | | | P Treated | | | | P/Cl Treated | | | |
|---|---|---|---|---|---|---|---|---|---|---|---|---|
| | Acid | | Neutral | | Acid | | Neutral | | Acid | | Neutral | |
| Soil Treatment | Conc | % Red | Conc | % Red | Con | % Red | Conc | % Red | Conc | % Red | Conc | % Red |
| None | 44 | | 33 | | 4.4 | | 2.5 | | 0.78 | | 0.73 | |
| Magnesium Added as Magnesium Nitrate | | | | | | | | | | | | |
| 0.24% Mg | 41.2 | 6 | 32.3 | | 1.12 | 75 | 1.17 | 53 | 0.73 | | 0.57 | 22 |
| 0.48% Mg | 40.0 | 9 | 27.7 | 16 | 0.67 | 85 | 0.72 | 71 | 1.11 | | 0.78 | |
| 1.2% Mg | 39.8 | 10 | 17.6 | 47 | 1.03 | 54 | 0.73 | 71 | 1.48 | | 0.58 | 21 |
| Calcium Added as Calcium nitrate | | | | | | | | | | | | |
| 0.40% Ca | 43.1 | 2 | 30.7 | 7 | 2.0 | 55 | 1.74 | 30 | 0.88 | | 0.42 | 43 |
| 0.80% Ca | 36.7 | 17 | 24.8 | 25 | 1.54 | 65 | 0.83 | 67 | 1.52 | | 0.42 | 43 |
| 2.0% Ca | 40.9 | 7 | 9.7 | 71 | 0.92 | 79 | 0.07 | 97 | 0.88 | | | |

TABLE 8b

Effect of Neutral Calcium and Magnesium Compounds on Lead Concentrations in Simulated Digestion Test Leachates - Sample 2

| | Simulated Digestion Test Leachate Lead Concentration, mg/L | | | | | | | | | | | |
|---|---|---|---|---|---|---|---|---|---|---|---|---|
| | Untreated | | | | P Treated | | | | P/Cl Treated | | | |
| | Acid | | Neutral | | Acid | | Neutral | | Acid | | Neutral | |
| Soil Treatment | Conc | % Red | Conc | % Red | Con | % Red | Conc | % Red | Conc | % Red | Conc | % Red |
| None | 17.1 | | 12.4 | | 5.25 | | 4.74 | | 4.69 | | 3.63 | |
| Magnesium Added as Magnesium Nitrate | | | | | | | | | | | | |
| 0.47% Mg | 19 | | 7.3 | 41 | 8.33 | | 3.58 | 25 | 5.33 | | 2.42 | 33 |
| 0.94% Mg | 18.4 | | 6.35 | 49 | 1.24 | 76 | 0.59 | 88 | 0.16 | 97 | 0.38 | 90 |
| 1.88% Mg | 17 | | 3.51 | 72 | 1.59 | 70 | 0.42 | 91 | 0.12 | 97 | 0.23 | 94 |
| 3.75% Mg | 7.2 | 58 | 1.57 | 87 | 2.54 | 52 | 1.06 | 78 | 0.48 | 90 | 0.15 | 96 |
| Calcium Added as Calcium Nitrate | | | | | | | | | | | | |
| 0.85% Ca | 12.0 | 30 | 5.36 | 57 | 0.43 | 92 | 7.25 | | 0.71 | 85 | 0.53 | 85 |
| 1.69% Ca | 13.6 | 21 | 4.19 | 66 | 0.75 | 86 | 4.07 | | 3.10 | | 0.32 | 91 |
| 3.39% Ca | 6.4 | 63 | 2.60 | 79 | 5.29 | | 3.6 | | 4.07 | | 0.17 | 96 |

The effectiveness of calcium and magnesium nitrate demonstrate that the reduction in lead is due to the presence of the calcium and magnesium ions, and not due to pH changes. The addition of sodium carbonate which has a similar effect on pH as the alkaline calcium or magnesium compounds, did not change the lead concentrations, again showing that the reduction in the magnesium and calcium treated samples is due to the presence of magnesium or calcium ions, and not due to pH changes. The addition of 5% $Mg(OH)_2$ to a sample of P-treated soil reduced the lead in the acid step of the PBET test from 5.3 to 2.31 mg/L, and in the neutral step from 4.74 to 0.19 mg/L The results for the addition of $Mg(OH)_2$ to P/Cl treated soil were similar to those for the P treated soil. A similar reduction in simulated digestion test solution lead concentrations is found when magnesium or calcium nitrate is used at a treatment additive. Addition of 1.88% magnesium as magnesium nitrate reduced the lead concentration leached form the soil in the acid step from 5.25 to 1.59 mg/L, and in the neutral extraction from 4.74 to 0.42 mg/L. Addition of 6.8% calcium as calcium nitrate reduced lead from 5.25 to 1.29 mg/L in the acid step and 4.74 to 0.71 mg/L in the neutral step of the simulated digestion test.

There is no regulatory requirement for reducing lead in the simulated digestion test, and thus no target criteria by which to determine successful treatment. Evaluating the success of the treatment process can be done by evaluating the percent reduction in lead concentrations, The addition of calcium or magnesium ions reduces the concentration of lead in the simulated digestion tests by between 10 and 97 percent.

The method may be used in conjunction with another treatment process, such as the addition of phosphate or phosphate plus chloride to stabilize the lead. The addition of magnesium or calcium to the phosphate treatment further reduces the simulated digestion test lead concentrations, as shown in Table 6. The addition of phosphate or phosphate plus chloride and magnesium or calcium can reduce lead concentrations in the simulated digestion tests by between 77 and 99% from the original untreated sample.

Each of the patents and literature articles cited hereinabove is incorporated by reference in its entirety. The description of the invention hereinabove is illustrative in nature. The scope of the invention patented is defined by the claims which follow.

What is claimed is:

1. A method of treating lead-contaminated waste materials or soil to reduce the lead available for leaching into the environment or for uptake during digestion, said method comprising the steps of:
    (a) adding ferrous iron to the contaminated waste materials or soil in an amount calculated to provide a ferrous iron content therein within the range 0.25% through 5% by weight relative to the total weight of the treated waste materials or soil and
    (b) oxidizing the ferrous iron in the waste materials or soil by drying or by chemical oxidation to form a ferric compound incorporating the lead.

2. The method of claim 1, wherein the ferrous iron is added to the contaminated waste materials or soil in the form of a liquid reagent containing a soluble ferrous salt.

3. The method of claim 2, wherein the soluble ferrous salt is ferrous nitrate, ferrous sulfate, or ferrous chloride.

4. The method of claim 1, wherein the ferrous iron is added to the contaminated waste materials or soil in the form of a dry reagent mix of a ferrous salt and water is subsequently added to dissolve the ferrous salt.

5. A method of treating lead-contaminated waste materials or soil to reduce the lead available for leaching into the environment or for uptake during digestion, said method comprising the steps of:
    (a) adding ferrous iron to the contaminated waste materials or soil in an amount calculated to provide a ferrous iron content therein within the range 0.25% through 5% by weight relative to the total weight of the treated waste materials or soil and
    (b) oxidizing the ferrous iron in the waste materials or soil, wherein oxidation of the ferrous iron is effected by atmospheric oxygen by aerating the soil or waste.

6. The method of claim 1, wherein oxidation of the ferrous iron is effected by a chemical oxidant.

7. The method of claim 6, wherein the chemical oxidant is hydrogen peroxide.

8. A method of treating lead-contaminated waste materials or soil to reduce the lead available for leaching into the environment or for uptake during digestion, said method comprising the steps of:

(a) adding ferrous iron to the contaminated waste materials or soil in an amount calculated to provide a ferrous iron content therein within the range 0.25% through 5% by weight relative to the total weight of the treated waste materials or soil and further adding a source of orthophosphate to the contaminated waste materials or soil in an amount calculated to provide an orthophosphate content therein within the range 1% through 10% by weight relative to the total weight of the treated waste materials or soil, and (b) oxidizing the ferrous iron in the waste materials or soil by drying or by chemical oxidation to form a ferric compound incorporating the lead.

9. The method of claim 8, wherein the ferrous iron is added to the contaminated waste materials or soil in an amount calculated to provide a ferrous iron content therein within the range 0.1% through 5% by weight relative to the total weight of the treated waste materials or soil.

10. The method of claim 8, wherein said source of orthophosphate is a member selected from the group consisting of phosphoric acid, sodium phosphate, triple superphosphate, or a combination thereof.

11. A method of treating lead-contaminated waste materials or soil to reduce the lead available for leaching into the environment or for uptake during digestion, said method comprising the steps of:

(a) adding ferrous iron to the contaminated waste materials or soil in an amount calculated to provide a ferrous iron content therein with the range 0.25% through 5% by weight relative to the total weight of the treated waste materials or soil, (b) oxidizing the ferrous iron in the waste materials or soil by drying or by chemical oxidation to form a ferric compound incorporating the lead, and (c) neutralizing an acid formed during the treatment process with an alkaline material selected from the group consisting of calcium carbonate, calcium hydroxide, calcium oxide, magnesium hydroxide, and magnesium oxide.

12. The method of claim 8, wherein the lead level is reduced to less than 0.75 mg/L as measured by the TCLP lead leaching test.

* * * * *